United States Patent
Kurokawa et al.

(10) Patent No.: US 8,351,188 B2
(45) Date of Patent: Jan. 8, 2013

(54) SOLID ELECTROLYTIC CAPACITOR HAVING FIRST AND SECOND LEAD FRAMES CONNECTED VIA A CONDUCTIVE MEMBER

(75) Inventors: Akinari Kurokawa, Daito (JP); Yoshikazu Hirata, Daito (JP); Takuji Yoshitomi, Katano (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 211 days.

(21) Appl. No.: 12/644,656

(22) Filed: Dec. 22, 2009

(65) Prior Publication Data
US 2010/0177463 A1    Jul. 15, 2010

(30) Foreign Application Priority Data
Jan. 14, 2009    (JP) .................. 2009-005975

(51) Int. Cl.
  H01G 4/228    (2006.01)
  H01G 9/00     (2006.01)
  H01G 9/04     (2006.01)
  H01G 9/145    (2006.01)
(52) U.S. Cl. .............. 361/540; 361/538; 361/528
(58) Field of Classification Search .......... 361/523, 361/540, 538, 532, 528
  See application file for complete search history.

(56) References Cited

U.S. PATENT DOCUMENTS

| | | | |
|---|---|---|---|
| 7,031,141 B2 * | 4/2006 | Kuriyama | 361/528 |
| 2009/0237867 A1 * | 9/2009 | Kurokawa | 361/540 |
| 2010/0073848 A1 * | 3/2010 | Kobayashi et al. | 361/528 |

FOREIGN PATENT DOCUMENTS

| | | | |
|---|---|---|---|
| DE | 3931249 A1 * | 3/1991 | |
| JP | 03089509 A * | 4/1991 | |
| JP | 9-266137 A | 10/1997 | |
| JP | 2002-246268 A | 8/2002 | |
| JP | 2004-247665 A | 9/2004 | |

* cited by examiner

Primary Examiner — David M Sinclair
(74) Attorney, Agent, or Firm — Westerman, Hattori, Daniels & Adrian, LLP

(57) ABSTRACT

A first lead frame has a cathode connection portion connected via a first electrically conductive member to a cathode portion, and a first connection portion having a first connection surface, and is at least partially, externally exposed. A second lead frame has a supporting connection portion connected via a second electrically conductive member to the cathode portion, and a second connection portion having a second connection surface facing the first connection surface. A third electrically conductive member interconnects the first and second connection portions. A solid electrolytic capacitor that can achieve low cost and high production yield can thus be provided.

3 Claims, 4 Drawing Sheets

SOLID ELECTROLYTIC CAPACITOR HAVING FIRST AND SECOND LEAD FRAMES CONNECTED VIA A CONDUCTIVE MEMBER

BACKGROUND OF THE INVENTION

1. Field of the Invention

The present invention relates generally to solid electrolytic capacitors.

2. Description of the Background Art

In recent years a variety of techniques have been proposed to reduce solid electrolytic capacitors in equivalent series resistance (ESR).

Japanese Patent Laying-open No. 2004-247665 discloses a solid electrolytic capacitor including a capacitor element, a cathode lead frame, and a supporting cathode lead frame. The cathode lead frame is connected to the capacitor element and at least partially exposed from an exterior of resin. The supporting cathode lead frame is connected to the capacitor element and the cathode lead frame. The cathode lead frame and the supporting cathode lead frame are laser-welded and thus interconnected.

Japanese Patent Laying-open No. 2002-246268 discloses a solid electrolytic capacitor including a capacitor element, an exterior of resin, a metal layer, and a lead frame. The lead frame is electrically connected to the capacitor element and at least partially exposed from the exterior of resin. The metal layer sandwiches the capacitor element, and via the metal layer the capacitor element and the lead frame are electrically connected therebetween. For connection, an electrically conductive adhesive is used, for example.

A capacitor element is sandwiched by a lead terminal attached in a method for example as described in Japanese Patent Laying-open No. 9-266137, as follows: the capacitor element is initially placed on a cathode lead terminal and bonded with silver paste. Subsequently, the capacitor element is bonded to a portion of the cathode lead terminal that is folded back with silver paste.

According to Japanese Patent Laying-open No. 2004-247665, when there is variation in production and a capacitor element is increased in thickness, the cathode lead frame and the supporting cathode lead frame are spaced by an increased distance and may thus not be welded together. This results in reduced production yield.

According to Japanese Patent Laying-open No. 2002-246268, it is necessary to provide a lead frame for electrical connection between an external portion of the capacitor and the metal layer. This results in increased production cost.

Furthermore, for a mass production process, in particular, it is necessary to rapidly transfer to a designated place a product having an electrically conductive adhesive applied thereto. In doing so, as the electrically conductive adhesive is unset, the metal layer may be displaced from a predetermined position. This results in reduced production yield.

According to Japanese Patent Laying-open No. 9-266137, the cathode lead terminal sandwiching the capacitor element exerts excessive pressure to the capacitor element and may thus damage the capacitor element. This results in the solid electrolytic capacitor's reduced production yield and impaired reliability.

Furthermore, this pressure may squeeze the silver paste out from between the cathode lead terminal and the capacitor element and as a result the cathode lead terminal and an anode can short-circuit. This decreases the solid electrolytic capacitor's production yield and reliability.

SUMMARY OF THE INVENTION

The present invention has been made in view of the above issues. One object of the present invention is to provide a solid electrolytic capacitor that can be fabricated at low cost and achieve high production yield. Another object of the present invention is to provide a method of fabricating a solid electrolytic capacitor achieving high production yield and having high reliability.

The present solid electrolytic capacitor has a capacitor element, first to third electrically conductive members, and first and second lead frames. The capacitor element has an anode portion, a dielectric coating on the anode portion, and a cathode portion on the dielectric coating. The first and second electrically conductive members are each deposited on the cathode portion. The first lead frame has a cathode connection portion connected via the first electrically conductive member to the cathode portion, and a first connection portion having a first connection surface. At least a part of the first lead frame is externally exposed. The second lead frame has a supporting connection portion connected via the second electrically conductive member to the cathode portion, and a second connection portion having a second connection surface facing the first connection surface. The third electrically conductive member interconnects the first and second connection portions.

The present solid electrolytic capacitor has a first lead frame and a second lead frame with a first connection portion and a second connection portion, respectively, connected by a third electrically conductive member. The third electrically conductive member can fill a gap between the first and second lead frames and thus ensures more reliable connection between the first and second lead frames. Increased production yield can thus be achieved.

Furthermore, the first lead frame has an externally exposed portion. This can eliminate the necessity of introducing an additional member for electrical connection between the first lead frame and a component or the like external to the solid electrolytic capacitor. Reduced production cost can thus be achieved.

Preferably, the second connection surface is tilted relative to the first connection surface. This allows the second lead frame to be attached without cooperating with the first lead frame to squeeze out the third electrically conductive member in a large amount from between the first and second lead frames.

Preferably, the first and second connection surfaces form an acute angle ranging from 3° to 15°. The angle of 3° or larger can more reliably reduce or prevent the third electrically conductive member squeezed out. The angle of 15° or smaller ensures that the first and second connection surfaces are bonded together over a further sufficient area.

Preferably, the second lead frame is smaller in thickness than the first lead frame. This can reduce the solid electrolytic capacitor in thickness.

The present method of fabricating a solid electrolytic capacitor includes the following steps:

A first electrically conductive member is deposited at a cathode connection portion of a first lead frame having the cathode connection portion and a first connection portion. A capacitor element having an anode portion, a dielectric coating on the anode portion, and a cathode portion on the dielectric coating, is placed to lie on the first electrically conductive member with the cathode portion in contact with the first electrically conductive member. Second and third electrically conductive members having viscosity are deposited on the cathode portion and the first connection portion, respectively. A second lead frame having a supporting connection portion and a second connection portion is moved along a surface of the cathode portion having the second electrically conductive member deposited thereon to attach the supporting connection portion and the second connection portion via the second and third electrically conductive members to the cathode portion and the first connection portion, respectively. The second and third electrically conductive members are set.

The present method of fabricating a solid electrolytic capacitor attaches the second lead frame to the cathode portion by moving the second lead frame along a surface of the cathode portion having the second electrically conductive member deposited thereon. The second lead frame can thus be attached without exerting large pressure on the cathode portion. This can reduce/prevent damage of the capacitor element, and the second electrically conductive member squeezed out. A solid electrolytic capacitor achieving high production yield and having high reliability can thus be fabricated.

Preferably, the step of setting the second and third electrically conductive members includes the following steps:

The second and third electrically conductive members are heated at a first temperature for a first period of time. The second and third electrically conductive members are cooled to a second temperature lower than the first temperature. The second and third electrically conductive members are reheated at a third temperature higher than the second temperature for a second period of time longer than the first period of time.

Thus heating for a first period of time shorter than a second period of time allows the second and third electrically conductive members to be set to an extent that can prevent the second lead frame from displacing. In other words, heating only for a short period of time allows the second lead frame to be less displaceable. This allows an in-process product without the second and third electrically conductive members set over a long period of time to be transferred with the second lead frame positionally less displaceable. Increased production efficiency and yield can be achieved.

Preferably, the viscosity is a coefficient of viscosity ranging from 300 dPa·s to 800 dPa·s. A coefficient of viscosity of 300 dPa·s or larger more reliably holds the third electrically conductive member if the first and second connection portions have a large distance therebetween. The first and second connection portions thus more reliably connected together can contribute to increased production yield. Furthermore, a coefficient of viscosity of 800 dPa·s or smaller allows the third electrically conductive member to be applied more easily.

The present solid electrolytic capacitor can thus achieve increased production yield and reduced production cost. Furthermore, the present method of fabricating a solid electrolytic capacitor can fabricate a solid electrolytic capacitor achieving high production yield and high reliability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiments will be described with reference to the drawings.

First Embodiment

Figure 1:
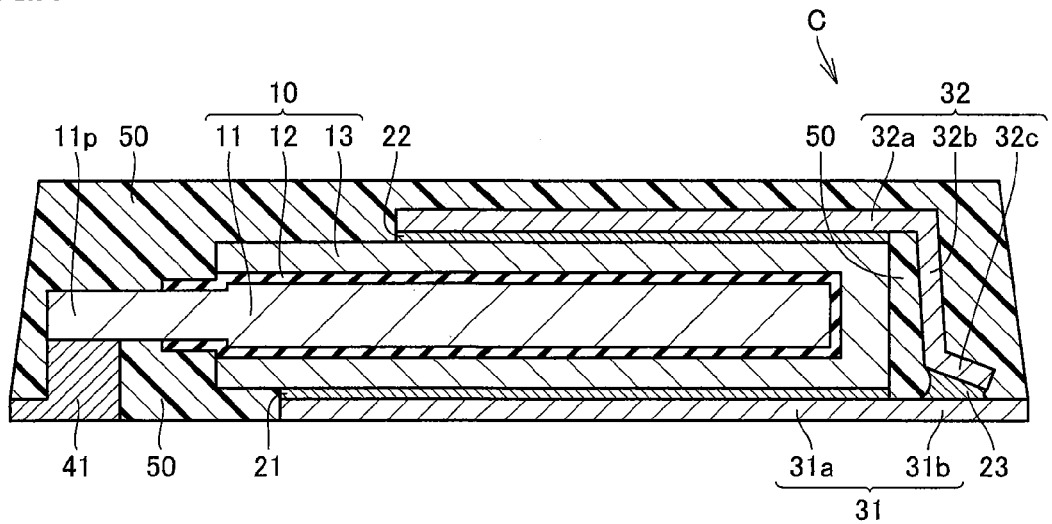
FIG. 1 is a cross section schematically showing a configuration of a solid electrolytic capacitor in a first embodiment of the present invention.
Figure 2:
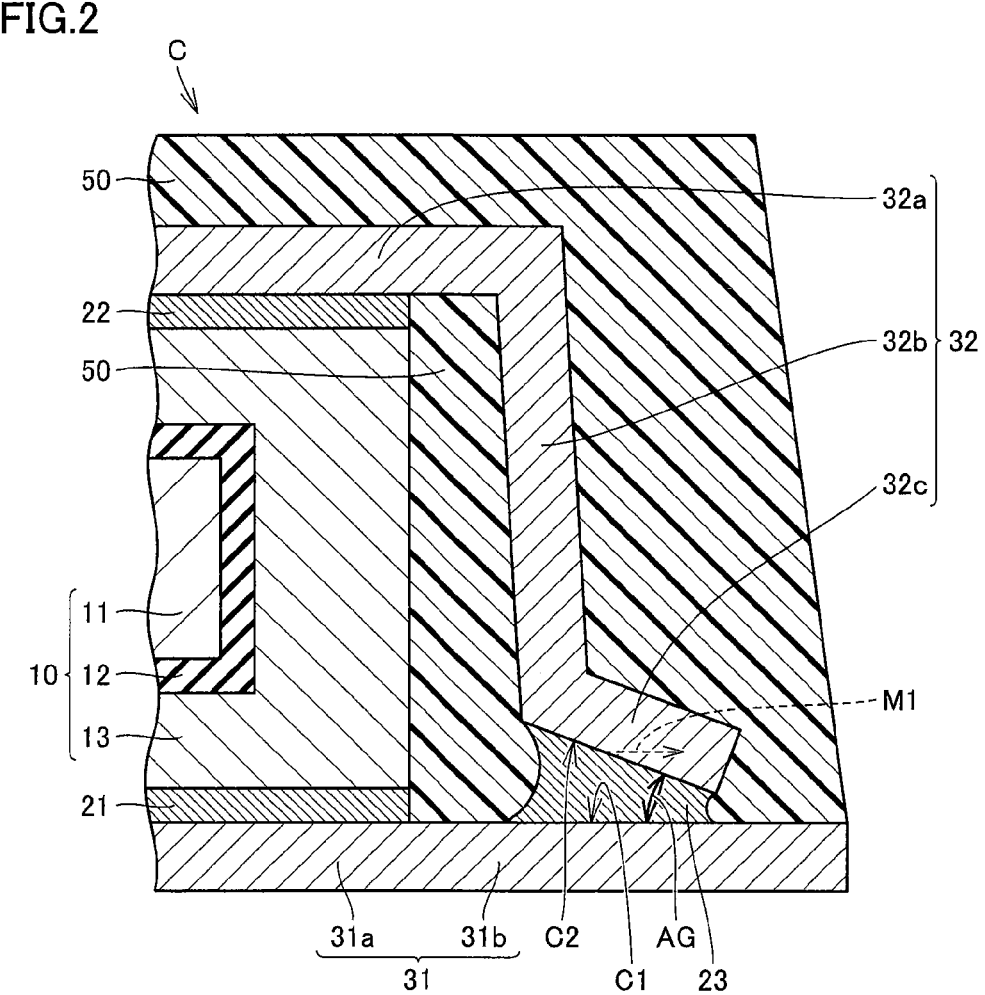
FIG. 2 is an enlarged view of a region indicated in FIG. 1 by an arrow C.

With reference to FIG. 1 and FIG. 2, the present embodiment provides a solid electrolytic capacitor having a capacitor element 10, first to third electrically conductive members 21-23, first and second lead frames 31, 32, an anode lead frame 41, and an exterior of resin 50.

Capacitor element 10 has an anode portion 11, a dielectric coating 12 on anode portion 11, and a cathode portion 13 on dielectric coating 12. Anode portion 11 is formed for example of aluminum (Al) or tantalum (Ta). Anode portion 11 has one side (a left side as seen in FIG. 1) with an anode lead 11p. Dielectric coating 12 is provided by oxidizing a surface of anode portion 11 excluding a portion of anode lead 11p. Cathode portion 13 is configured on dielectric coating 12 for example by an electrically conductive polymer layer, a carbon layer and a silver paste layer deposited in sequence.

First to third electrically conductive members 21-23 are formed for example of a viscous electrically conductive adhesive that is set. First and second electrically conductive members 21, 22 are each deposited on cathode portion 13. Third electrically conductive member 23 bonds first and second lead frames 31, 32 together.

First lead frame 31 has a cathode connection portion 31a and a first connection portion 31b. Cathode connection portion 31a is connected via first electrically conductive member 21 to cathode portion 13. First connection portion 31b has a first connection surface C1. First lead frame 31 has at least a portion exposed from exterior of resin 50.

Second lead frame 32 has a supporting connection portion 32a, a coupling portion 32b, and a second connection portion 32c. Supporting connection portion 32a is connected via second electrically conductive member 22 to cathode portion 13. Coupling portion 32b couples supporting connection portion 32a and second connection portion 32c together. Second connection portion 32c is connected to first connection portion 31b by third electrically conductive member 23. Second connection portion 32c has a second connection surface C2 facing first connection surface C1.

Preferably, second connection surface C2 is tilted relative to first connection surface C1. Still preferably, first and second connection surfaces C1, C2 form an angle AG ranging from 3° to 15°.

The present embodiment provides a method of fabricating the solid electrolytic capacitor, as will be described hereinafter.

Figure 3:
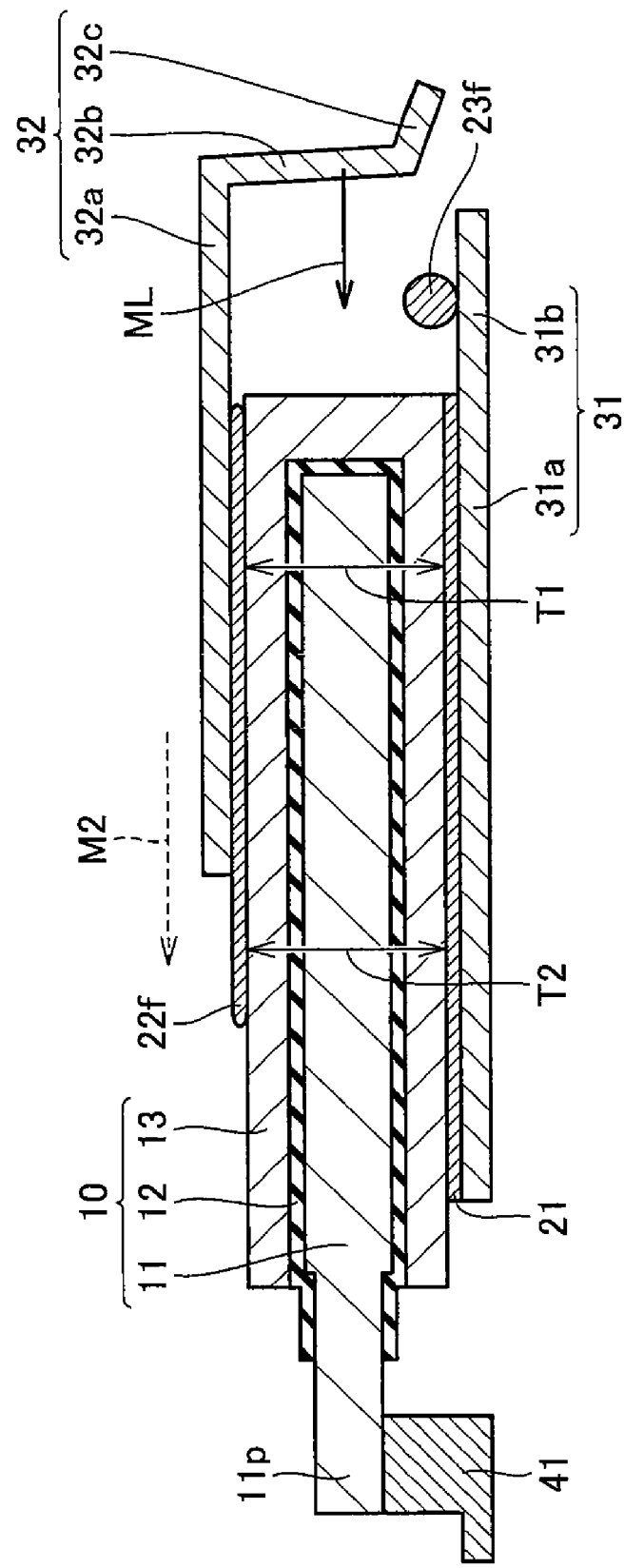
FIG. 3 is a cross section schematically showing how a second lead frame is attached in a method of fabricating a solid electrolytic capacitor in the first embodiment of the present invention.

With reference mainly to FIG. 3, capacitor element 10 as shown in FIG. 3 is initially prepared. Anode portion 11, dielectric coating 12 and cathode portion 13 stacked in layers at a position distant from anode lead 11p has a thickness T1, and at a position close to anode lead 11p has a thickness T2. While thicknesses T1 and T2 are designed to be equal, thickness T2 may in reality be smaller than thickness T1 due to variation in production. For example, thickness T2 may in reality be smaller than thickness T1 by approximately 0.2 mm.

Then, anode lead frame 41 is welded to anode portion 11 at anode lead 11p. Furthermore, first electrically conductive member 21 is deposited on first lead frame 31 at cathode connection portion 31a for example by applying an electrically conductive adhesive.

Then, capacitor element 10 is placed on first electrically conductive member 21 such that cathode portion 13 is brought into contact with first electrically conductive member 21. Thus, cathode portion 13 and first lead frame 31 have one major surface (a bottom surface thereof as seen in FIG. 3) and cathode connection portion 31a, respectively, electrically interconnected via first electrically conductive member 21.

Then, a viscous, second electrically conductive member 22f is deposited on cathode portion 13 at the other major surface (a top surface thereof as seen in FIG. 3). Furthermore on first connection portion 31b a viscous, third electrically conductive member 23f is deposited. Second and third electrically conductive members 22f, 23f are formed for example of an electrically conductive adhesive. Preferably, second and third electrically conductive members 22f, 23f each have a coefficient of viscosity ranging from 300 dPa·s to 800 dPa·s.

Then, second lead frame 32 is disposed at that side of capacitor element 10 which is opposite to anode lead 11p. Then, as indicated in FIG. 3 by an arrow ML, second lead frame 32 is moved in a direction along that surface of cathode portion 13 which has second electrically conductive member 22f deposited thereon. Thus, second electrically conductive member 22f on that portion of capacitor element 10 having thickness T1 is initially brought into contact with second lead frame 32 at supporting connection portion 32a.

Second lead frame 32 is further moved along arrow ML shown in FIG. 3. This moves a portion of second electrically conductive member 22f on the portion of capacitor element 10 having thickness T1, as indicated by a broken arrow M2, onto a portion of capacitor element 10 having thickness T2. In other words, second electrically conductive member 22f on the portion of thickness T2 is larger in thickness than that on the portion of thickness T1. Furthermore, supporting connection portion 32a and second connection portion 32c are attached via second and third electrically conductive members 22f, 23f to cathode portion 13 and first connection portion 31b, respectively.

Then, second and third electrically conductive members 22f, 23f are set to provide second and third electrically conductive members 22, 23, respectively (see FIG. 1), preferably as follows:

Initially, second and third electrically conductive members 22f, 23f are heated at a first temperature for a first period of time. More specifically, they are heated for example at 150° C. for one minute or shorter. Second and third electrically conductive members 22f, 23f thus heated are set to an extent preventing second lead frame 32 from displacing. In other words, second and third electrically conductive members 22f, 23f are set provisionally.

Then, second and third electrically conductive members 22, 23 are cooled to a second temperature lower than the first temperature. More specifically, they are cooled for example to room temperature. While or after they are cooled, the in-process product is transferred.

Then, second and third electrically conductive members 22, 23 are reheated at a third temperature higher than the second temperature for a second period of time longer than the first period of time. More specifically, they are reheated for example at 150° C. for two hours or longer. Second and third electrically conductive members 22f, 23f thus heated are set more completely.

Then, exterior of resin 50 provides sealing. The present embodiment thus provides a solid electrolytic capacitor (see FIG. 1).

Figure 6:
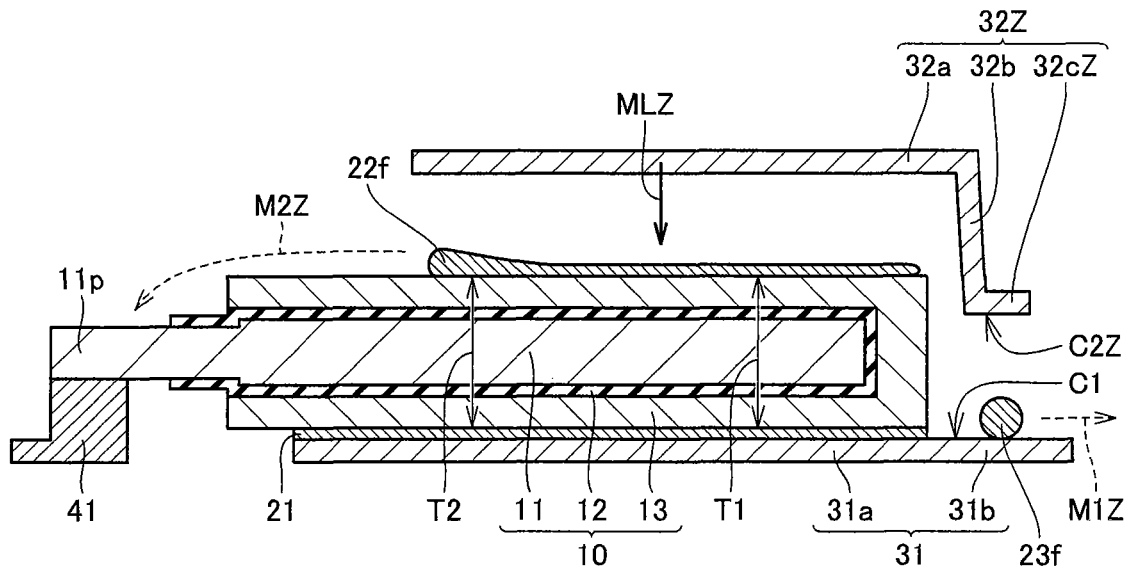
FIG. 6 is a cross section in a second comparative example schematically showing how a second lead frame is attached.

With reference to FIG. 6, a comparative example will be described.

A second lead frame 32Z at a second connection portion 32cZ has a second connection surface C2Z parallel to first connection surface C1. Accordingly, in attaching second lead frame 32Z, third electrically conductive member 23f is squeezable out from between first and second lead frames 31 and 32Z, as indicated by a broken arrow M1Z.

Furthermore, second lead frame 32Z is attached as it is moved to cooperate with first lead frame 31 to together sandwich capacitor element 10, as indicated by an arrow MLZ. Such attachment exerts large pressure on capacitor element 10 and may damage capacitor element 10.

For example, if in this comparative example, variation in production provides thickness T2 smaller than thickness T1, ensuring that the portion of thickness T2 and second lead frame 32Z are bonded together requires that the portion of thickness T2 have second electrically conductive member 22f previously applied thereon thick. If such application is done with thickness T2 substantially equal to thickness T1, in particular, then, as indicated by a broken arrow M2Z, second electrically conductive member 22f may be squeezed out. This may short-circuit second lead frame 32Z and anode lead 11p.

Figure 4:
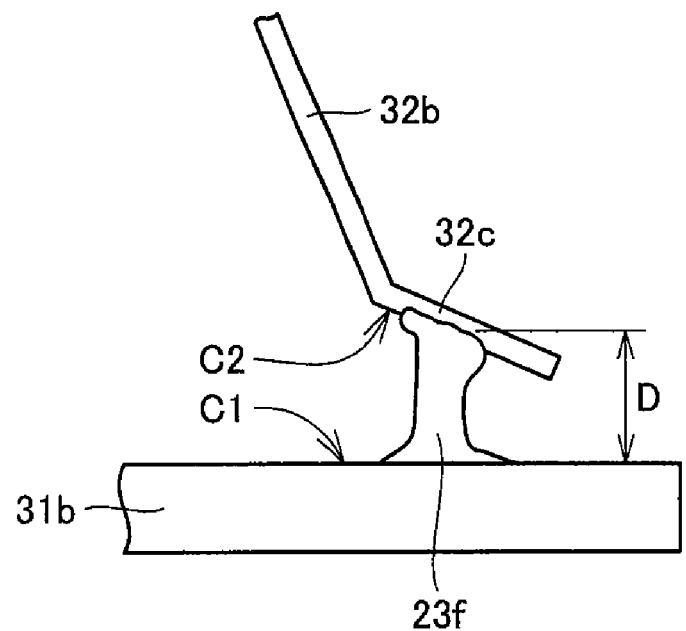
FIG. 4 is a partial front view schematically showing first and second lead frames bonded together in the method of fabricating the solid electrolytic capacitor in the first embodiment of the present invention.

The present solid electrolytic capacitor allows third electrically conductive member 23 to fill a distance D between first and second lead frames 31 and 32, as shown in FIG. 4. This ensures more reliable connection between first and second lead frames 31 and 32. The solid electrolytic capacitor's increased production yield can be achieved.

Furthermore, first lead frame 31 (FIG. 1) has a portion exposed from exterior of resin 50. This can eliminate the necessity of introducing an additional member for electrical connection between first lead frame 31 and a component or the like external to the solid electrolytic capacitor. The solid electrolytic capacitor's production cost can thus be reduced.

Furthermore, as shown in FIG. 2, second connection surface C2 is tilted relative to first connection surface C1 by angle AG. This allows second lead frame 32 to be attached without cooperating with first lead frame 31 to squeeze out third electrically conductive member 23 in a large amount from between first and second lead frames 31 and 32, as indicated by broken arrow M1.

Angle AG of 3° or larger can more reliably reduce or prevent third electrically conductive member 23 squeezed out. Angle AG of 15° or smaller ensures that first and second connection surfaces C1, C2 are bonded together over a further sufficient area.

The present method of fabricating a solid electrolytic capacitor attaches second lead frame 32 to cathode portion 13 by moving second lead frame 32 along a surface of cathode portion 13 having second electrically conductive member 22 deposited thereon, as indicated by arrow M1 (see FIG. 3). Second lead frame 32 can thus be attached without exerting large pressure on cathode portion 13. This can reduce/prevent damage of capacitor element 10, and second electrically conductive member 22f squeezed out toward anode lead 11p. A solid electrolytic capacitor achieving high production yield and having high reliability can thus be fabricated.

Furthermore, as shown in FIG. 3, in attaching second lead frame 32, as indicated by broken arrow M2, second electrically conductive member 22f is moved and thus increased in thickness at a portion of capacitor element 10 that can have small thickness (i.e., the portion of thickness T2). This allows more reliable bonding on the portion of thickness T2.

Figure 5:
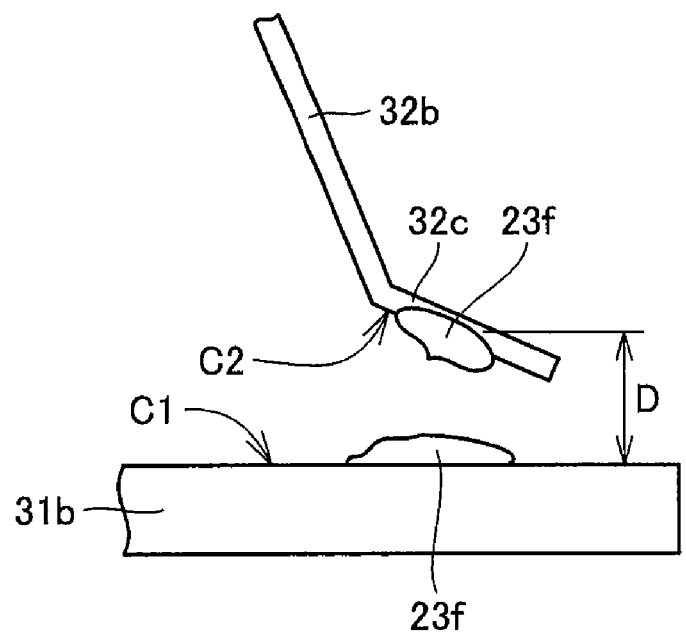
FIG. 5 is a partial front view in a first comparative example schematically showing a failure to bond the first and second lead frames together.

Furthermore, as shown in FIG. 4, third electrically conductive member 23f having a coefficient of viscosity of 300 dPa·s or larger is more reliably held between first and second connection portions 31b and 32c if first and second connection portions 31b, 32c have therebetween a distance D large to a degree. In other words, it can reduce/prevent a defect as shown in the exemplary variation (see FIG. 5). First and second connection portions 31b, 32c thus more reliably connected together can contribute to increased production yield.

Furthermore, third electrically conductive member 23f having a coefficient of viscosity of 800 dPa·s or smaller can be more easily applied.

Furthermore, after second lead frame 32 is attached, second and third electrically conductive members 22f, 23f are set provisionally. This can reduce/prevent displacement of second lead frame 32, and also allows the in-process product to be transferred rapidly. Increased production efficiency and yield can be achieved.

Second Embodiment

Figure 7:
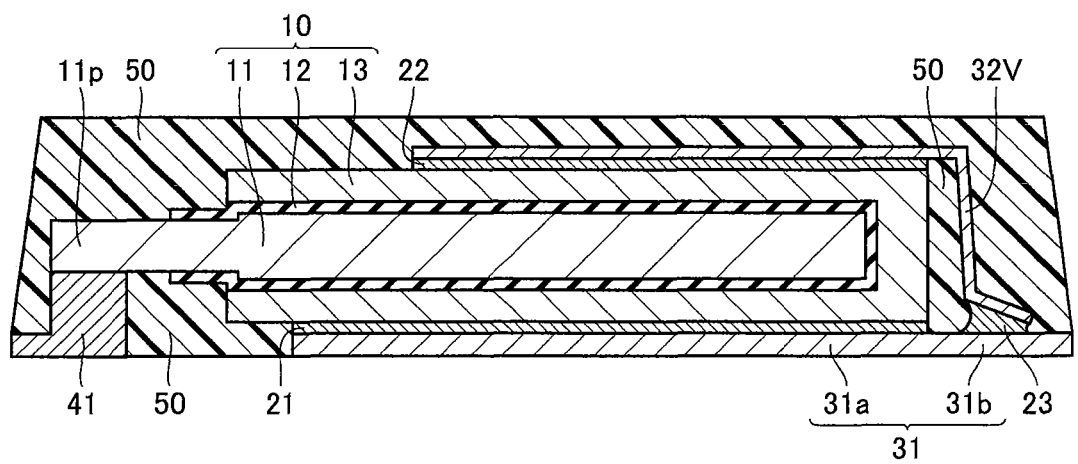
FIG. 7 is a cross section schematically showing a configuration of a solid electrolytic capacitor in a second embodiment of the present invention.

With reference mainly to FIG. 7, the present embodiment provides a solid electrolytic capacitor having second lead frame 32 (FIG. 1) replaced with a second lead frame 32V smaller in thickness than first lead frame 31.

The remainder in configuration is substantially identical to that of the first embodiment described above. Accordingly, identical or corresponding components are identically denoted and will not be described repeatedly.

The present embodiment provides second lead frame 32V small in thickness and hence a solid electrolytic capacitor reduced in thickness.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising:
   a capacitor element having an anode portion, a dielectric coating on said anode portion, and a cathode portion on said dielectric coating;
   first and second electrically conductive members each on said cathode portion and composed of conductive adhesive;
   a first lead frame having a cathode connection portion connected via said first electrically conductive member to said cathode portion, and a first connection portion having a first connection surface, at least a part of said first lead frame being externally exposed;
   a second lead frame having a supporting connection portion connected via said second electrically conductive member to said cathode portion, and a second connection portion having a second connection surface facing said first connection surface; and
   a third electrically conductive member interconnecting said first and second connection surfaces;
   wherein said second connection surface is tilted relative to said first connection surface, and
   wherein said third electrically conductive member is composed of conductive adhesive.

2. The solid electrolytic capacitor according to claim 1, wherein said first and second connection surfaces form an acute angle ranging from 3° to 15°.

3. The solid electrolytic capacitor according to claim 1, wherein said second lead frame is smaller in thickness than said first lead frame.

* * * * *